United States Patent
Haerterich et al.

(10) Patent No.: US 10,454,969 B2
(45) Date of Patent: Oct. 22, 2019

(54) AUTOMATIC GENERATION OF LOW-INTERACTION HONEYPOTS

(71) Applicant: SAP SE, Walldorf (DE)

(72) Inventors: Martin Haerterich, Wiesloch (DE); Martin Johns, Karlsruhe (DE); Marius Musch, Karlsruhe (DE)

(73) Assignee: SAP SE, Walldorf (DE)

( * ) Notice: Subject to any disclaimer, the term of this patent is extended or adjusted under 35 U.S.C. 154(b) by 241 days.

(21) Appl. No.: 15/650,974

(22) Filed: Jul. 17, 2017

(65) Prior Publication Data
US 2019/0020683 A1  Jan. 17, 2019

(51) Int. Cl.
*H04L 29/06* (2006.01)
*G06F 8/60* (2018.01)

(52) U.S. Cl.
CPC ...... *H04L 63/1491* (2013.01); *H04L 63/1441* (2013.01); *G06F 8/60* (2013.01); *H04L 63/1433* (2013.01)

(58) Field of Classification Search
CPC ............ H04L 63/1433; H04L 63/1441; H04L 63/1491; H04L 29/06; G06F 8/60
See application file for complete search history.

(56) References Cited

U.S. PATENT DOCUMENTS

| | | | | |
|---|---|---|---|---|
| 2014/0101724 A1* | 4/2014 | Wick | .............. | H04L 63/1491 726/4 |
| 2017/0155666 A1* | 6/2017 | Seul | ................... | H04L 63/1416 |
| 2017/0331856 A1* | 11/2017 | Vissamsetty | ........ | H04L 63/1416 |
| 2017/0331858 A1* | 11/2017 | Clark, III | ............ | H04L 63/1491 |
| 2017/0353492 A1* | 12/2017 | Wick | ................... | H04L 41/0853 |
| 2018/0152477 A1* | 5/2018 | Kakumaru | ............. | H04L 63/10 |

OTHER PUBLICATIONS

Weidong Cui, Vern Paxson, Nicholas C. Weaver & Randy H. Katz; Protocol-independent Adaptive Replay of Application Dialog; Proceedings of the 13th Annual Network and Distributed System Security Symposium (NDSS); Feb. 2006; University of California, International Computer Science Institute, Berkeley, CA; (http://citeseerx.ist.psu.edu/viewdoc/download?doi=10.1.1.62.6740&rep=rep1&type=pdf).

Neil Fraser; Diff Strategies; Apr. 2006; Neil Fraser, California,USA; (https://neil.fraser.name/writing/diff/).

(Continued)

*Primary Examiner* — Jayesh M Jhaveri
(74) *Attorney, Agent, or Firm* — Buckley, Maschoff & Talwalkar LLC

(57) ABSTRACT

Various embodiments of systems, computer program products, and methods to automatically generate low-interaction honeypots to protect application landscapes through are described herein. In an aspect, representative applications associated with resources in a network are identified. The low-interaction honeypots are automatically generated for the identified representative applications. Further, the representative applications are probed to retrieve responses corresponding to different requests. Templates are generated corresponding to request-response pairs by parsing the responses and the requests. During operation, new requests for accessing the resources are responded based on the generated templates. The new requests and corresponding responses are recorded.

17 Claims, 7 Drawing Sheets

(56) References Cited

OTHER PUBLICATIONS

J. W. Hunt & M. D. McIlroy; An Algorithm for Differential File Comparison; This document was scanned from Bell Laboratories Computing Science Technical Report #41; Jul. 1976; Dartmouth Edu, Hanover, NH, USA; (http://www.cs.dartmouth.edu/~doug/diff.pdf).

Corrado Leita, Ken Mermoud & Marc Dacier; ScriptGen: an automated script generation tool for Honeyd; 21st Annual Computer Security Applications Conference (ACSAC'05); Dec. 2005; IEEE, NY, USA; (http://citeseerx.ist.psu.edu/viewdoc/download?doi=10.1.1.475.3119&rep=rep1&type=pdf).

Eric Limer; How Hackers Wrecked the Internet Using DVRs and Webcams; Oct. 21, 2016; Hearst Communications, Inc., NY, USA; (http://www.popularmechanics.com/technology/infrastructure/a23504/mirai-botnet-internet-of-things-ddos-attack/).

Ryan McGeehan & Greg Smith; Google Hack Honeypot; Feb. 2013; SourceForge Media, LLC, CA, USA; (http://ghh.sourceforge.net/).

Webb Miller & Eugene W. Myers; A File Comparison Program; Software: Practice and Experience, vol. 15 (11). 1025-1040; Nov. 1985; John Wiley & Sons, NJ, USA; (https://pdfs.semanticscholar.org/3ea9/cd35f39e8c128f39f13148e91466715f4ee2.pdf?_ga=2.21949756.62266516.1502252977-879423264.1502252977).

Iyatiti Mokube & Michele Adams; Honeypots: Concepts, approaches, and challenges; Proceedings of the 45th Annual Southeast Regional Conference; Mar. 23-24, 2007; ACM, NY, USA; (http://citeseerx.ist.psu.edu/viewdoc/download;jsessionid=645397EA532BD9E16BBD78AD816CDED1?doi=10.1.1,561,1885&rep=rep1&type=pdf).

B. Mphago, O. Bagwasi, B. Phofuetsile, and H. Hlomani; Deception in Dynamic Web Application Honeypots: Case of Glastopf; Proceedings of the International Conference on Security and Management (SAM); Jul. 2015; The World Congress in Computer Science, Computer Engineering, & Applied Computing, Administered by Universal Conference Management Systems & Support (UCMSS), San Diego, California, USA; (http://worldcomp-proceedings.com/proc/p2015/SAM9766.pdf).

Michael Mueter, Felix Freiling, Thorsten Holz and Jeanna Mattews; A generic toolkit for converting web applications into high-interaction honey-pots; 2008; Department of Computer Science, Clarkson University, NY, USA; (https://pdfs.semanticscholar.org/5c7e/235c7af0ca6a0c65f4cff38195ae13188e42.pdf?_ga=2.123211020.62266516.1502252977-879423264.1502252977).

Eugene W.Myers; An O(ND) Difference Algorithm and Its Variations; Algorithmica, vol. 1, Issue 1-4, pp. 251-266; Nov. 1986; Springer-Verlag Inc, New York, USA; (http://www.xmailserver.org/diff2.pdf).

Fabien Pouget and Marc Dacier; White Paper: Honeypot, Honeynet: A comparative survey; Sep. 14, 2003; EURECOM, Sophia Antipolis, France; (http://www.eurecom.fr/en/publication/1273/download/ce-pougfa-030914.pdf).

Web Document; DShield Web Honeypot Project; Accessed in Google on Aug. 9, 2017; (https://sites.google.com/site/webhoneypotsite/).

Hihat; High Interaction Honeypot Analysis Tool; 2007; SourceForge Media, LLC, CA, USA; (http://hihat.sourceforge.net/).

Niels Provos and Thorsten Holz; Virtual Honeypots: From Botnet Tracking to Intrusion Detection; Chapter 1: Honeypot Background, Section 1.2; Pearson Education 2007; Addison-Wesley, Boston, USA; (https://books.google.co.in/books/about/Virtual_Honeypots.html?id=QuHnPgAACAAJ&redir_esc=y).

Lukas Rist, Sven Vetsh, Marcel Kossin and Michael Mauer; Know Your Tools: GLASTOPF—A dynamic, low-interaction web application honeypot; The Honeynet Project; Nov. 4, 2010; Honeynet.Org, MI, USA; (https://www.honeynet.org/sites/default/files/files/KYT-Glastopf-Final_v1.pdf).

Sam Small, Joshua Mason, Fabian Monrose, Niels Provos and Adam Stubblefield; To catch a predator: a natural language approach for eliciting malicious payloads; Proceeding SS'08 Proceedings of the 17th conference on Security symposium pp. 171-183; Jul. 28-Aug. 1, 2008; USENIX Association Berkeley, CA, USA; (https://www.usenix.org/legacy/event/sec08/tech/full_papers/small/small_html/).

Lance Spitzer; The Value of Honeypots, Part One: Definitions and Values of Honeypots; Oct. 10, 2001; Symantec Corporation, CA, USA; (https://www.symantec.com/connect/articles/value-honeypots-part-one-definitions-and-values-honeypots).

Lance Spitzer; Honeypots: Tracking Hackers; Sep. 13, 2002; Addison Wesley, Boston, USA; (http://www.it-docs.net/ddata/792.pdf).

\* cited by examiner

```
GET /index.php?search=fbg5rmtxacfq7j1m &phrase=all          ⌐410A
Accept-Encoding=gzip, deflate
[...]
200 OK                              ⌐420
Date=Wed, 11 Jan 2017 13:37:0102 GMT
Content-Type=text/html; charset=utf-8
[...]
<div class="btn-group pull-left">                           ⌐410B
  <input type="text" name="search" size="30" value="fbg5rmtxacfq7j1m"
     />
</div>
```

FIG. 4A

```
GET /index.php?search=$ REFLECTION-01 $ &phrase=all         ⌐430A
Accept-Encoding=gzip, deflate
[...]
200 OK                              ⌐440
Date=$ TIME EEE,-dd-MMM-YY-HH:mm:ss $ GMT
Content-Type=text/html; charset=utf-8
[...]
<div class="btn-group pull-left">
   <input type="text" name="search" size="30" value="
      $ REFLECTION-01 $" />
</div>        430B
```

FIG. 4B

AUTOMATIC GENERATION OF LOW-INTERACTION HONEYPOTS

BACKGROUND

Nowadays, networked applications are ubiquitous, ranging from small, single purpose Internet of things (IoT) devices, over outsourced cloud services, up to complex application landscapes. Systems or resources associated with a networked application may offer public interfaces for potentially untrusted parties to interact with, often in the form of hypertext transfer protocol (HTTP) requests. Systems may be insecure either due to configuration, such as publicly known and unchanged default passwords, or because of security vulnerabilities, both disclosed and zerodays (e.g., a security hole). Hence, insecure systems may pose a significant challenge for security professionals. For example, it is often unknown which class of systems are currently targeted by malicious parties, until it is too late.

Low-interaction honeypots (LIHPs) are considered as a tool to monitor malicious activities and detect previously unknown attacks. A low-interaction honeypot is a dedicated networked application that emulates the appearance and behavior of a real system. Further, the low-interaction honeypot exposes public interfaces and behavior that are same or similar to the real system with the goal to observe unsolicited malicious traffic. To get a comprehensive insight in the current attack landscape, it may be necessary to emulate a large range of systems and applications. However, the set-up of the low-interaction honeypot for a system may be a non-trivial task as the generation and configuration of the honeypot is a manual task. Also, the generation and operation of individual non-trivial low-interaction honeypots may be complex in respect of both required manual effort and computational resources.

BRIEF DESCRIPTION OF THE DRAWINGS

The embodiments are illustrated by way of examples and not by way of limitation in the figures of the accompanying drawings in which like references indicate similar elements. The embodiments may be best understood from the following detailed description taken in conjunction with the accompanying drawings.

FIG. 4A is an example depicting diffing between two requests, according to an embodiment.

FIG. 4B is an example template resulted from the diffing of FIG. 4A, according to an embodiment.

DETAILED DESCRIPTION

Embodiments of techniques to automatically generate low-interaction honeypots to protect application landscapes are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instance, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In this document, various methods, processes and procedures are detailed. Although particular steps may be described in a certain sequence, such a sequence may be mainly for convenience and clarity. A particular step may be repeated more than once, may occur before or after other steps (even if those steps are otherwise described in another sequence), and may occur in parallel with other steps. Further, a step may be executed upon executing another step. Such a situation may be specifically pointed out when not clear from the context. A particular step may be omitted. Further, it is to be understood that the various actions (retrieving, determining, generating, persisting, recording, probing, parsing, and so on) may be performed by a hardware device (e.g., computing system), even if the action may be authorized, initiated or triggered by a user, or even if the hardware device is controlled by a computer program, software, firmware, and the like.

Figure 1:
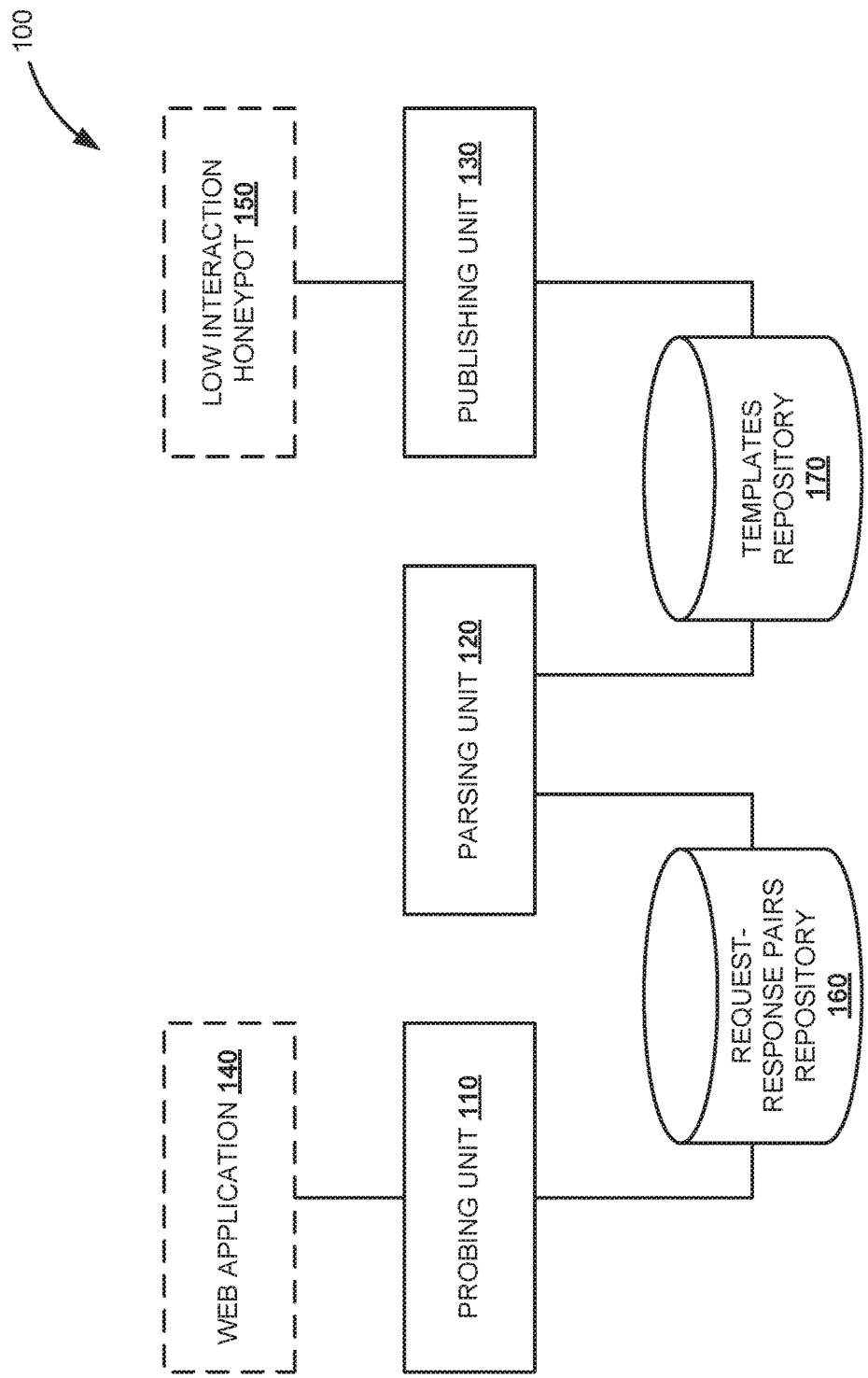
FIG. 1 is a block diagram of a computing environment of a honeypot factory unit illustrating generation and operation of low-interaction honeypots to protect an application landscape, according to one embodiment.

FIG. 1 is a block diagram of a computing environment of honeypot factory unit 100 illustrating generation and operation of low-interaction honeypots to protect an application landscape, according to one embodiment. The application landscape is a structure and/or coherent set of information systems, services, modules, functionalities, applications, components, interfaces, resources and the like in a network associated with an organization. In one embodiment, servers, resources and/or systems associated with the application landscape may be protected from malicious activities by automatically generating the low-interaction honeypots to corresponding applications in the network by the honeypot factory unit 100.

In one embodiment, the systems or resources in the application landscape associated with the network are identified. For the identified systems, representative applications (e.g., web application 140) are selected. The representative applications may be representatives for the systems that share same characteristics. Further, low-interaction honeypots (e.g., low-interaction honey pot 150) are automatically generated for the web application 140 by the honeypot factory unit 100. The low-interaction honeypot 150 is a dedicated networked application that emulates the appearance and behavior of a system. Upon automatically generating the low-interaction honeypots, a honeypot factory instance may be deployed to operate the generated low-interaction honeypots in the network.

During operation, publishing unit 130 of the honeypot factory unit 100 may utilize pre-generated templates to respond to new requests (e.g., HTP requests) through the low-interaction honeypot 150. The templates to respond to the new requests may be generated by probing unit 110 and parsing unit 120 of the honeypot factory unit 100. The interactions (e.g., requests and corresponding responses) received by the honeypot factory instance are recorded and analyzed for malicious activities (e.g., unknown or high-volume attacks).

The honeypot factory unit 100 depicts the probing unit 110 and the parsing unit 120. The probing unit 110 and the parsing unit 120 may reside in a computer system or different computer systems, for instance. The computer system may include one or more processors and a memory. For example, the computer system may be a server, a workstation, an embedded system or other device having at least one processor and memory.

In one embodiment, the probing unit 110 may probe representative applications (e.g., the web application 140) in the application landscape to retrieve responses corresponding to different requests. For example, the web application 140 is recursively probed to retrieve the responses for one or more web addresses (e.g., uniform resource locators (URLs)). Further, besides extracting links found in the responses for probing the web application 140, known URLs may be used as input to retrieve different responses from the web application 140. Also, every encountered hypertext markup language (HTML) form (e.g., login dialogues) may be filled and submitted to retrieve different responses from the web application 140. Hence, different resources are identified and a range of different responses are retrieved. For example, a login page might return multiple different error messages (e.g., responses) depending on the input (e.g., requests). The requests and corresponding responses pairs may be stored for later processing in request-response pairs repository 160 (e.g., the request-response pairs are stored in a relational database using structured query language (SQL)).

In one embodiment, the parsing unit 120 processes the stored request-response pairs to analyze variances in the responses to identical or similar requests. When a same response is received for a particular resource, then the resource may be considered as static. For non-static resources, the honeypot factory unit 100 may utilize comparative analysis on multiple responses corresponding to similar requests to identify dynamic components of the resource and their respective value range (e.g., different responses). Hence, through a comprehensive examination of the original system's services and behavior, the honeypot factory unit 100 may learn how the resources or target systems reacts to various requests, especially with respect to static and dynamic ranges in the communication. The result of parsing may result in generation of templates corresponding to the request-response pairs including the static code of the page such as HTML, JavaScript®, and the like, but with the dynamic parts replaced using placeholders in honeypot factory unit's 100 custom syntax. If similar enough, several responses may be consolidated into one single template. For example, consider two HTML responses (a) and (b). The part after "ssid" is detected as a dynamic part consisting of four alphanumeric characters. Further, the generated templates are stored in templates repository 170.

click<a href="/login.php?ssid=wG45">here</a>  (a)

click<a href="/login.php?ssid=4SH8">here</a>  (b)

In one embodiment, the publishing unit 130 may utilize the generated templates to respond to new requests (e.g., HTTP requests) through the low-interaction honeypot 150. For example, when a new request to access a resource is received by the web application 140, the publishing unit 130 may find the best response by identifying appropriate generated template. The new request may be arbitrary, and might not have been observed before. Further, to identify the best response, a metric may be designed to compare HTTP requests (e.g., requests stored while probing and the new request) and score the similarity. Hence, during operation, the honeypot factory unit 100 may use the templates to convincingly emulate the original web application 140. As no real web application logic is implemented and the honeypot factory unit 100 parrots learned responses back, the operation of a given system may require minimum computational resources. Also, the honeypot factory unit 100 may allow hosting a large number of individual low-interaction honeypots at the same time. Further, interactions (e.g., new requests and corresponding responses) with the honeypot factory unit 100 are logged to serve as a basis for evaluations on attackers and attack trends.

In one embodiment, probing the web application 140 by the probing unit 110 and parsing the request-response pairs by the parsing unit 120 may be executed once during generation of the low-interaction honeypot 150. Further, the actions of the publishing unit 130 is a continuous process, running on the resources hosting the low-interaction honeypot 150. Hence, due to the low footprint of publishing, high scalability may be achieved. For example, a number of different low-interaction honeypots may be operated using single instance of the honeypot factory unit 100.

The honeypot factory unit 100 may automatically generate the low-interaction honeypots by emulating the pre-authentication surface of the web application. Further, automatic generation allows for the quick generation of the low-interaction honeypots for many different web applications, or for many different versions of the same application. Thus, the approach of automatically generating the low-interaction honeypots solves the problem of manual work and lowers the chances of successful fingerprinting. Further, automatically generating the low-interaction honeypots may increase the scalability of deployment of the large number of low-interaction honeypots. With honeypot factory unit 100, a low-interaction honeypot infrastructure for an organization's full application landscape may be generated, deployed and operated automatically with little effort and minimal resource requirements.

Figure 2:
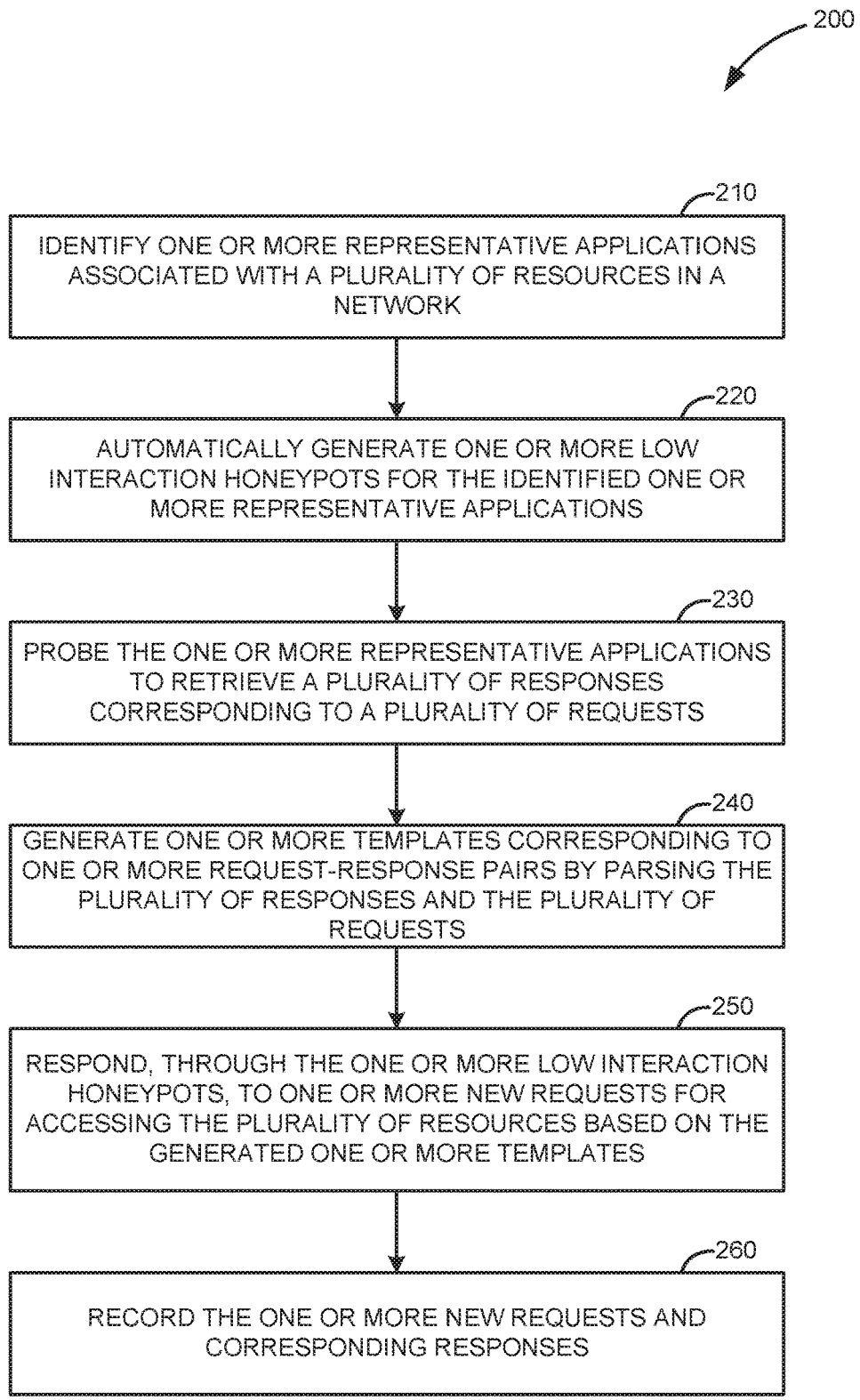
FIG. 2 is a flow diagram illustrating an example process to automatically generate low-interaction honeypots to protect an application landscape, according to an embodiment.

FIG. 2 is a flow diagram illustrating example process 200 to generate low-interaction honeypots to protect an application landscape, according to an embodiment. A honeypot factory unit may be used to generate and operate the low-interaction honeypots for desired systems or resources in the application landscape. At 210, representative applications associated with resources in a network are identified. In one embodiment, the resources in the network are identified. Upon identifying the resources, applications corresponding to the resources are determined. Further, the representative applications from the determined applications for the resources that share same characteristics are identified. For example, an application operator may survey operative network and retrieve information about network reachable servers or resources. For each of these resources, triplet information may be retrieved i.e., application name, version and configuration (e.g., ["word press", "version 2.3", "with module socialWP2.1"]). Further, the application operator may select a representative application for each unique triplet as the representative for the systems that share the same characteristics. For example, for a resource Web server, the determined applications can be Apache® HTTP Server and Nginx®. The representative application can be Nginx® 1.12.0 default installation on Unix® server. For resource content management system (CMS), the determined applications can be WordPress and Drupal™. The representative application can be Drupal™ 8.3.4 with module "Pathauto."

At 220, low-interaction honeypots are automatically generated for the identified one or more representative applications. Further, honeypot factory instance may be deployed to operate the generated low-interaction honeypots in the network. For example, the application operator may use honey pot factory unit to automatically generate a low-interaction honeypot version for each of the representative applications (e.g., different web application and/or many different versions of the same application). Further, the application operator deploys honeypot factory instance to operate the generated low-interaction honeypots in the network. Templates repository and a publishing unit of the honey factory unit may be used to deploy the honeypot factory instance. Also, multiple domain name system (DNS) names may be assigned to the systems, each mapped to one generated low-interaction honeypot for identification. The automatic generation of the low-interaction honeypots may use using a probing unit and a parsing unit, described in steps 230 and 240. Hence, no manual intervention may be required to generate and deploy the low-interaction honeypot. Thereby, the honeypot factory unit may be able to convincingly simulate a multitude of applications in various versions.

At 230, the representative applications are probed to retrieve responses corresponding to different requests. For example, for probing applications, a fuzzer may be designed and integrated into the web crawler for automatic observation or extraction of different request-response pairs. Everything that allows inputs is filled with random values (e.g., parameters in the query of an URL, input elements of HTML forms, values of HTTP request headers, and the like). Also, multiple instances of the prober may be initiated at the same time to speed up crawling.

For example, the probing unit may use HTML requests, a graphical user interface (GUI)-less browser written in Java® for probing the representative applications or web applications. During the recursive crawl of a web application, resources referencing to HTML pages are extracted. Each of these resources is downloaded to later differentiate static from dynamic resources, and random from session tokens by a parsing unit (e.g., described in greater detail in FIG. 3). The probing unit may follow redirects, executes JavaScript®, records all XMLHttpRequests (XHRs) and submits HTML forms to discover as many resources as possible on a remote server. Further, common files such as robots.txt and sitemap.xml are also requested to discover new URLs, which are possibly not linked in other locations, for instance. Furthermore, the requests are fuzzed by changing the HTTP method and mutating the headers (e.g., especially web cookies) and the URL query to learn more about the behavior of the web application in respect to changes in the requests. In addition, the probing unit may keep track of visited URLs.

At 240, the templates corresponding to the request-response pairs are generated by parsing the request-response pairs by the parsing unit. In one embodiment, parsing the request-response pairs may include identifying static and non-static resources in the resources by determining differences in the responses for identical requests. Further, the templates are generated based on the identified static and non-static resources.

For example, the parsing unit preprocesses the responses with a variety of regular expressions to find dynamic values like date fields that rarely change. Further, diffing may be applied to the responses to similar requests using, for instance, Myers' diff algorithm followed by a semantic cleanup to remove short and coincidental equalities within longer changes. The resulting substitutions are then classified into different variables (e.g., variables such as random tokens, session tokens, timestamps, reflections and unknown variables). For example, the reflections are detected by searching for substitutions that occur in both the request and the corresponding response. By comparing responses obtained with and without session cookies, random tokens that always change can be distinguished from session tokens. Hence, parsing the request-response pairs includes applying diffing to generate the templates. Parsing is described in greater detail in FIGS. 3, 4A and 4B.

At 250, when new requests are received to access resources, the new requests are responded to through the low-interaction honeypots using the generated templates. In one embodiment, responding to the new requests for accessing the resources using the templates includes analyzing the templates to determine best templates to respond to the new requests and generating the corresponding responses based on the determined best templates. An example of a new request and the best template to respond to the new request is provided in FIGS. 5 and 6.

For example, the publishing unit may be based on NanoHTTPD, a flexible, lightweight HTTP server implementation written in Java®. For each incoming new request, the most suitable template is selected and variables are replaced to build a realistic response. Further, tokens are generated based on the length and distribution of the characters observed during the probing to imitate their behavior. For each reflection, the correct position of the value in the newly received request is searched for and then copied into the response. The publishing unit not only imitates the body, but also other parts of the response including the HTTP headers. Also, an implementation of possible compression algorithms may be used by the publishing unit for generating responses based on the templates. Thus, with honeypot factory unit, a viable concept to generate, deploy and operate large numbers of heterogeneous low-interaction honeypots on a large scale may be achieved.

At 260, interactions through the low-interaction honeypots are persisted by recording the new requests and corresponding responses. Further, the recorded information may be used to analyze malicious activities on the resources. Through the recorded information, the low-interaction honeypots may observe previously unknown attack vectors and may alert the application operator in respect to previously unknown threats.

Hence, the honeypot factory unit may be able to emulate a web application, regardless of the technology stack used by the original application. By emulating the web application, generation of a wide variety of low-interaction honeypots can be ensured without being limited to specific technologies (e.g., applications written in hypertext preprocessor (PHP)). Also, the generated low-interaction honeypots may approximate indistinguishability from the real system (e.g., applies to deceiving automated observers, such as fingerprinting, vulnerability testing, or mass scanning tools).

Figure 3:
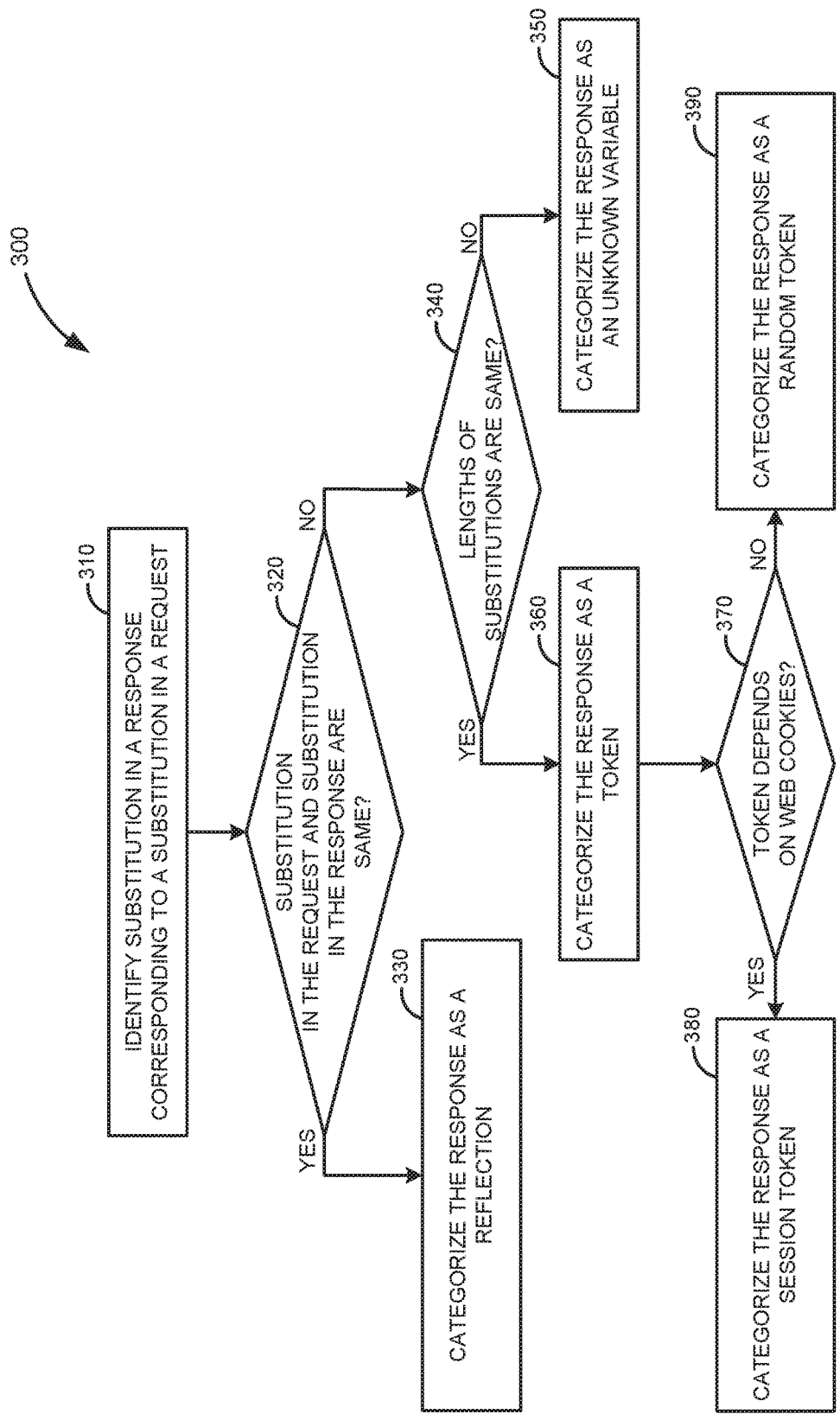
FIG. 3 is a flow diagram illustrating an example process to determine different types of variables in request-response pairs, according to an embodiment.

FIG. 3 is a flow diagram illustrating example process 300 to determine different types of variables in request-response pairs, according to an embodiment. During parsing, to determine dynamic parts of a response, a representation of the differences between two files (e.g., request and corresponding response) may be generated. The task of comparing two files may be performed using diffing or diff, a data comparison tool that calculates and displays the differences between two files. Diffing consists of a sequence of insertions and deletions that are applied to the first file. For plain text and most code, diffing may use a line-based diffing, which is usually easier to read than the inline changes.

For example, a honeypot factory unit may use byte-wise diffing. The reason to use the byte-wise diffing in the context of the web is that JavaScript® is often minified to save bandwidth during transmission to a client. Minifying code may be defined as removing unnecessary characters like spaces and line breaks, as long as removal does not change the functionality of the code. Further, minifying code may result in a single line with thousands of characters and rendering a line-based approach unusable. To avoid short sequences of matching characters, as they can be found even inside completely random hexadecimal SIDs, the diffing is post-processed with a semantic cleanup. The cleanup removes short equalities within longer changes. For example, consider two responses (c) and (d). The value parameter contains a random parameter. However, occasionally some characters might still be the same. In the example, the fourth character is "B" both times. Thereby, a semantic cleanup is required to correctly identify the whole value as a random token and not two random tokens with a static "B" between.

[ . . . ]<input type="hidden" name="csrf" value="3A1B07A14" [ . . . ]    (c)

[ . . . ]<input type="hidden" name="csrf" value="2F5B9CA38" [ . . . ]    (d)

In one embodiment, based on the list of diffs, a parser unit may start interpreting. Hence, a new operation called substitution may be introduced, which is a deletion directly followed by an insertion. Each substitution is analyzed and categorized into different types of variables such as, but are not limited to random tokens, session tokens, timestamps, reflections and unknown variables as illustrated in FIG. 3. A substitution occurs in the diff if there is a deletion followed by an insertion with similar length. In other words, a specific part of the response is dynamic and each substitution itself is such a dynamic part. For example, consider two HTML responses (e) and (f), where in the response (f) "w45" is deleted and "4SH8" inserted together being the substitution "wG454SH8." They are identified by applying the diff algorithm to similar requests.

click <a href="/login.php?ssid=wG45">here</a>    (e)

click <a href="/login.php?ssid=4SH8">here</a>    (f)

At 310, upon applying substitution, substitution in the response corresponding to substitution in the request is identified. At 320, a check is made to determine whether the substitution in the response is same as the substitution in the request. At 330, when the substitutions are same, the response is categorized as a reflection. In other words, to find the reflections, the parser unit goes through each of the substitutions in the request and searches the response for occurrences of the same substitution. Reflections occur when input is copied into the output. Reflections are often the case in HTML forms. For example, if a search form is submitted, many websites may show the search term again on the results page. Hence, a part of the URL or a part of the body of a POST request could be found in the body of the response. Further, the response may be considered as the reflection when the same string appears in both the request and the response. A change in the input, for example in the cookie of the request, may lead to the change of some other token, but such indirect effects may not be considered as the reflection. The remaining substitutions are either of type random token, session token or unknown.

At 340, when the substitution in the request and the corresponding substitution in the response are not the same, a check is made to determine whether lengths of the substitutions are same. To make sure that the changes in natural text or code are not erroneously identified as tokens, there is an additional requirement to the length of the change. For example, if the length between the deletion and the insertion differs by more than 2 characters and ratio between them is over 1.5, the substitution is not considered as a token. When the lengths are not the same, the response is categorized as an unknown variable, at 350. Unknown variables may be used to describe variable that may not be fit into the other categories. The unknown variables are usually changes in natural text on the rendered page or in the code behind that page. Inferring the semantics of such changes would be infeasibly complex and hence may be labelled as unknown.

At 360, when the lengths are same, the response may be categorized as a token. Further, a check is made to determine whether the token depends on web cookies, at 370. To differentiate between random and session tokens, the probing unit may initially make multiple requests with different cookies. Substitutions occurring when the cookie changed have to be session tokens, while substitutions changing regardless of the cookies are considered as random tokens. At 380, when the token depends on the web cookies, the response is categorized as a session token.

At 390, when the token does not depend on the web cookies, the response is categorized as a random token. The random tokens are arbitrary strings or numbers with no easily observable system to them. They can be found anywhere in the headers, body or even URL, for example as cryptographic nonce. Tokens often use character sets like hexadecimal and alphanumeric. For example, the random tokens may look like "7279786989", and "486F6E6579706F747321" and "SG9uZXlwb3RzIQ." The session tokens are a special case of random tokens. They are also generated randomly, but bound to a session and therefore have a longer lifetime than random tokens. The session tokens are most often found in web cookies and sometimes also in a URL.

Timestamps are representation of the time, be it the time of the day, the date or both together. There are many different possible ways to display the same timestamp, such as, but are not limited to "Sep. 1, 2017", "2017-01-09T09:39:48", "Mon, 9 Jan. 2017 09:39:48." Timestamps may not be detected purely on the base of the diff, as they may change rarely. For example, if the page prints out the current date but not the current time. Therefore, timestamp is detected via various regular expressions, as neither the current local time of the server is known, nor the format is used to represent that time.

In one embodiment, a template may be generated for requests-response pairs retrieved during the probing, in which the dynamic parts are described by placeholders using a specific syntax. The placeholders are based on the variables and described by a custom syntax. For example, similar to programming languages like hypertext preprocessor (PHP), dynamic and static parts are mixed in one file. Variables inserted during the parsing may use a syntax "$_INSTRUCTION_PARAMETERS_$." The underscore in the middle may be omitted when there are no parameters for the instruction. FIG. 4A is an example depicting diffing between two requests, according to an embodiment. The diff between two requests depicts reflection variable (e.g., 410A and 410B) and timestamp (e.g., 420). FIG. 4B is an example template resulted from the diffing of FIG. 4A, according to an embodiment.

Each of the detected variables is described by the syntax in a way specific to a type, such as tokens in general may look like "$_TOKEN-01_0405-1145679a_$." In the example, "0405" encodes the length and "1145679a" are characters in the substitution. As the length of the deletion and insertion may slightly differ, both the minimal and maximal observed values may have to be stored. With this information, convincingly similar tokens can be generated later. The random and session tokens are stored in the same way, with the difference that the session tokens begin with "$_SESSION."

Timestamps are built by describing their structure. For example, days replaced with "dd" and months with "MMM" as shown in FIG. 4B. A full timestamp may look like $_TIME dd-MMM-YY-HH:mm:ss_$ (e.g., 440). Reflections may require an ID, as multiple reflections could be present in one single template. Reflections are replaced in both request and response with $_REFLECTION-ID_$ (e.g., 430A and 430B).

As the probing unit requests each page multiple times and with fuzzed inputs, the parser may have to decide for each of these responses if it can be merged into an existing template. For example, the same login page might return different error messages, depending on the input. If the template contains a substitution of type unknown or if there is one long isolated deletion or insertion, that template is considered to be not mergeable with other templates and saved separately.

Figure 5:
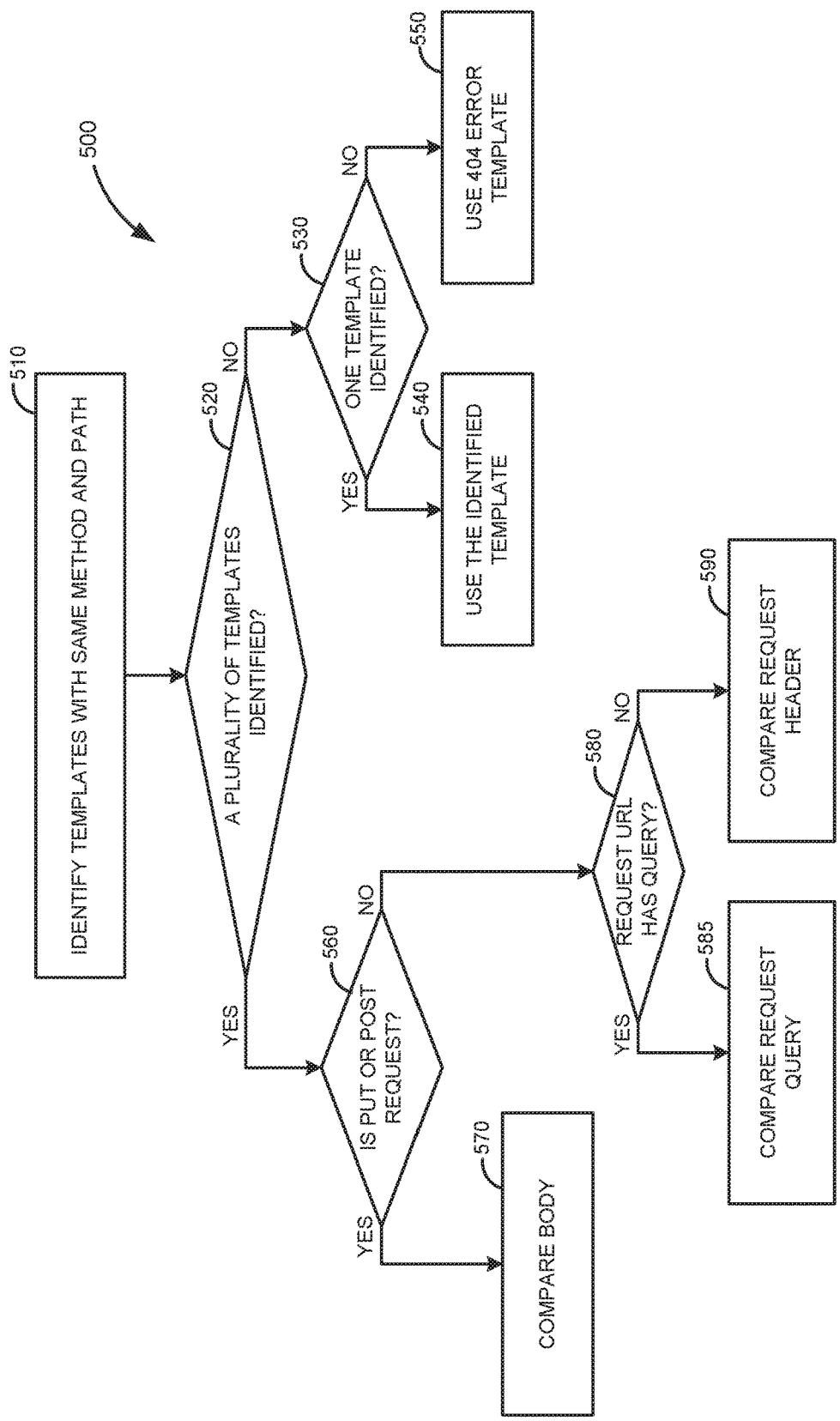
FIG. 5 is a flow diagram illustrating an example process to select a template to respond to a new request, according to an embodiment.

FIG. 5 is a flow diagram illustrating example process 500 to select a template to respond to a new request, according to an embodiment. During operation, a honeypot factory unit may use previously generated templates to respond to new requests to access applications. Given an arbitrary HTTP request, a best template may be determined to use for a response. Further, there may be cases where requests are ambiguous and multiple templates could be used, or cases where there might be no template at all matching the requested resource.

As a basis for a similarity metric for HTTP requests, the different parts of the request are ordered by their significance for the response. A higher ranking means that if a part of the request changes, there is a higher likelihood that the response will significantly change, too. For example, starting with the important ranking may be generated such as HTTP method, Path of the URL, HTTP body (e.g., if PUT/POST) or query of the URL and HTP headers.

At 510, templates with same "method" and "path" are identified. At 520, a check is made to determine whether a plurality of templates is identified. When there is no plurality of templates identified, a check is made to determine whether one template is identified, at 530. When only one template is identified, the identified template is used for responding to the request, at 540. When none of the templates are identified, a template with error code 404 may be selected for responding to the request, at 550. Hence, the "method" and "path", may be deemed important that they have to match exactly. If there is only one template where the "method" and "path" both match, then the template is used. On the other hand, if there is no template satisfying this requirement, all templates are reached for responses with error code 404 and one of them is selected. This indicates that the requested resource is not available in the same manner as the real application that would present such an error.

When there is more than one template with matching "method" and "path", a publishing unit may decide an appropriate template. For example, when there is more than one template matching "method" and "path", similarity between different bodies, queries or headers are determined. Accordingly, a check is made to determine whether the request is PUT or POST request, at 560. When the request is PUT or POST request, body of the request is compared with the templates to determine the best template to respond to the request, at 570. When the request is not PUT or POST request, a check is made to determine whether the request URL includes a query, at 580. When the request URL includes the query, the request query is compared with the templates to determine the best template to respond to the request, at 585. Further, when the request URL does not include the query, a request header is compared with the templates to determine the best template to respond to the request, at 590. Also, when multiple templates are identified, the best templates to respond to the new requests are determined based on ranks or scores associated with the templates as described in FIG. 6. For example, consider for a new request: GET/index.php?page=settings&event-click HTTP/1.0, templates (g), (h), (i) and (j) are identified. Templates (h) and (i) are selected, as the method (GET) and path (/index.php) matches. As more than one template was selected, the scores for the templates are determined to find the best template to respond with, as described in FIG. 6.

| | |
|---|---|
| GET/start.html HTTP/1.0 | (g) |
| GET/index.php?page=profile&event=click HTTP/1.0 | (h) |
| GET/index.php?page=settings&event=click HTTP/1.0 | (i) |
| POST/index.php?redirect=false HTTP/1.0 | (j) |

Figure 6:
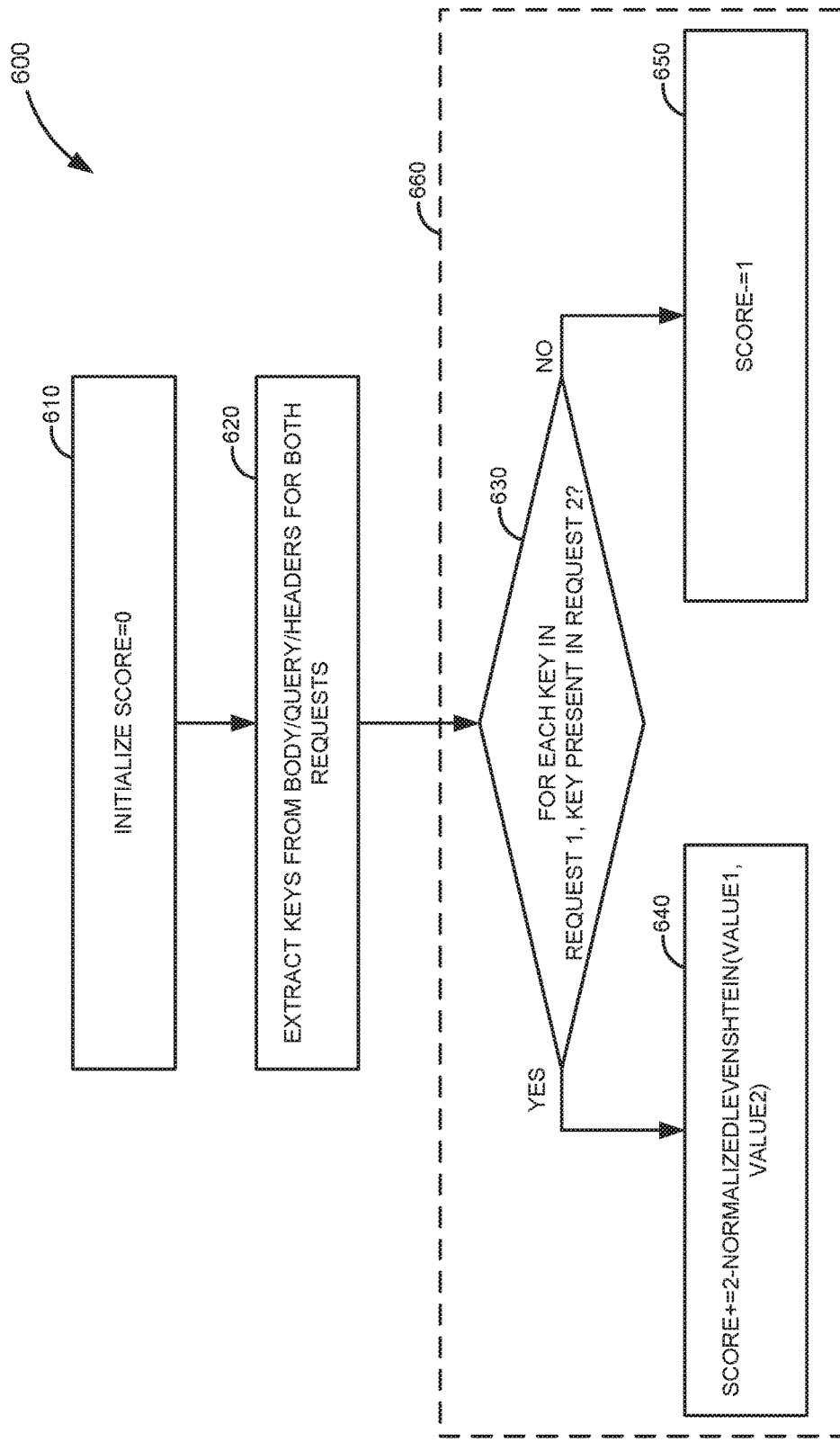
FIG. 6 is a flow diagram illustrating an example process to determine scores for templates, according to an embodiment.

FIG. 6 is a flow diagram illustrating example process 600 to determine scores for templates, according to an embodiment. The score may be determined for each identified template and then a template with a highest score may be used in responding to a new request. At 610, score is initialed to zero. At 620, keys from body, query and headers are retrieved for both requests (e.g., the new request and a request associated with a template). At 630, a check is made to determine whether each key in one request, a corresponding key exists in second request. When the keys are present, the score is determined using an equation (e.g., 2-NORMALIZEDLEVENSHTEIN(VALUE1, VALUE2)), at 640. When the keys are not present, the score is not increased, at 650. Hence, the score is based on each key in new request and corresponding key in the request associated with the template, as shown in 660. Further, based on scores, the template with highest score is determined as the best template to respond to the new request. For example, the scores for templates (h) and (i) are determined by using the equation. Consider query of new request as "?service=skinning&resource=img&img=img.banner." Query of template (h) is "?service=skinning&resource=stylesheet." Hence, the score is 2 (e.g., +2+1−1=2). Query of template (i) is "?service=skinning&resource=img&img=img.banner.logo."

Hence, the score is 5.7 (e.g., +2+2+1.7=5.7). Therefore, template (i) is selected to respond.

In one embodiment, upon determining the most fitting or highest scored template, a HTTP response is generated from the template. Generating the HTTP response from the template may require iterating variables in the template and replacing them with the actual content. For example, timestamp variables are replaced by the current time formatted as described in the parameters of the variable.

For reflection variables, the publishing unit may find the position of a reflected part of the input in the newly received request and extract value from the new request. As long as the reflections are never the keys, semantic knowledge about the protocol may be used. By starting from the reflection variable in the template and searching for the nearest key, it is possible to narrow down the position of the reflection to the value of that key. Now either the whole value is the reflection or the reflection is a substring of that value. In the second case, the value can be found by searching for its surrounding characters, but limiting the search to be inside the value of the identified key.

Tokens are generated based on the characteristics of their observed values. The publishing unit may have to decide the length of the new token by randomly selecting a number between or equal to the minimum and maximum length. Further, for each character of the new token, randomly select one of the character of the character set at the end of the token. However, to create realistic tokens that look similar to the real ones, characters within some ranges are generalized. For example, four different alphabets may be used (e.g., uppercase letters, lowercase letters, numbers and special characters). If the selected character is a number or letter, character may be randomly selected from its corresponding alphabet. Special characters on the other hand are not generalized and stay exactly the same, as their semantic impact is unknown. For example, if the letter K is selected from the character set, a random uppercase letter would be inserted. Thereby, tokens with similar statistical distributions as the observed tokens may be generated.

Session tokens are generated in the same manner as the random tokens. Also, if the same cookies are received again in future, instead of generating new values for the session tokens, the stored values are used and the new values for the random tokens may be generated.

Some embodiments may include the above-described methods being written as one or more software components. These components, and the functionality associated with them, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices: magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 7:
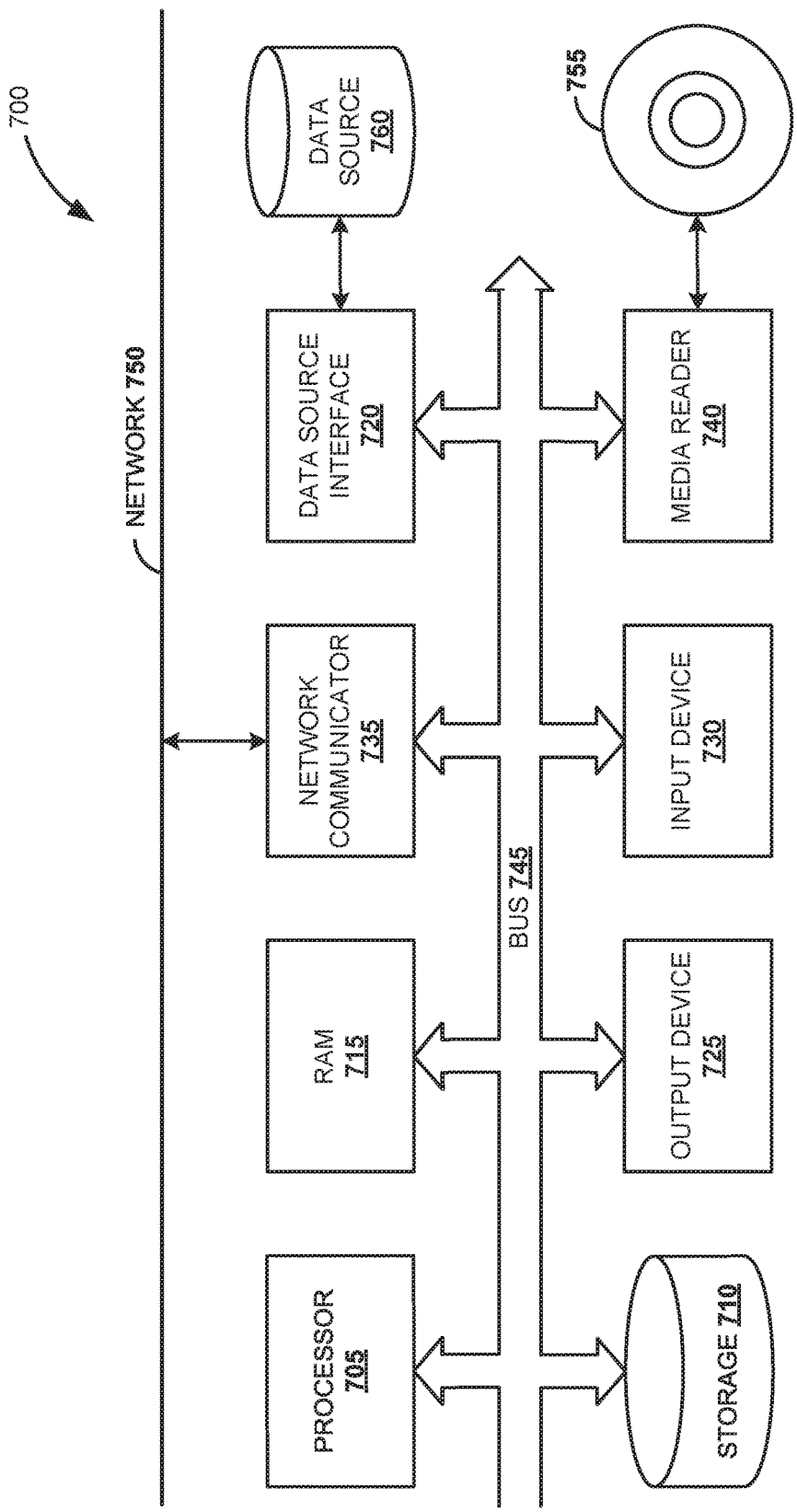
FIG. 7 is a block diagram illustrating an example computer system, according to an embodiment.

FIG. 7 is a block diagram of example computer system 700, according to an embodiment. The computer system 700 includes a processor 705 that executes software instructions or code stored on a computer readable storage medium 755 to perform the above-illustrated methods. The processor 705 can include a plurality of cores. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. According to some embodiments, such as some in-memory computing system embodiments, the RAM 715 can have sufficient storage capacity to store much of the data required for processing in the RAM 715 instead of in the storage 710. In some embodiments, the data required for processing may be stored in the RAM 715. The stored instructions may be further compiled to generate other representations of the instructions and dynamically stored in the RAM 715. The processor 705 reads instructions from the RAM 715 and performs actions as instructed. According to one embodiment, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. One or more of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments, the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or more embodiments is to be determined by the following claims, which are to be interpreted in accordance with established doctrines of claim construction.

What is claimed is:

1. A non-transitory computer readable storage medium storing instructions, which when executed by a computer cause the computer to:
   identify one or more representative applications associated with a plurality of resources in a network;
   automatically generate one or more low-interaction honeypots for the identified one or more representative applications;
   probe the one or more representative applications to retrieve a plurality of responses corresponding to a plurality of requests;
   generate one or more templates corresponding to one or more request-response pairs by parsing the plurality of responses and the plurality of requests;
   respond, through the one or more low-interaction honeypots, to one or more new requests for accessing the plurality of resources using the generated one or more templates,
   wherein responding to the one or more new requests for accessing the plurality of resources using the one or more templates comprises analyzing the one or more templates to determine best templates to respond to the one or more new requests and generating the corresponding responses based on the determined best templates; and
   record the one or more new requests and corresponding responses.

2. The non-transitory computer-readable medium of claim 1, wherein identifying the one or more representative applications comprises:
   identifying the plurality of resources in the network;
   determining one or more applications corresponding to the plurality of resources; and
   identifying the one or more representative application from the one or more applications for the plurality of resources that share same characteristics.

3. The non-transitory computer-readable medium of claim 1, wherein the best templates to respond to the one or more new requests are determined based on ranks associated with the one or more templates.

4. The non-transitory computer-readable medium of claim 1, wherein parsing the plurality of responses and the plurality of requests comprises:
   identifying static and non-static resources in the plurality of resources by determining differences in the plurality of responses for identical requests; and
   generating the one or more templates based on the identified static and non-static resources.

5. The non-transitory computer-readable medium of claim 1, wherein parsing the plurality of responses and the plurality of requests comprises applying diffing to generate the one or more templates.

6. The non-transitory computer-readable medium of claim 1, wherein automatically generating the one or more low-interaction honeypots further comprises deploying a honeypot factory instance to operate the generated one or more low-interaction honeypots in the network.

7. A computer implemented method to automatically generate low-interaction honeypots, comprising:
   identifying one or more representative applications associated with a plurality of resources in a network;
   automatically generating one or more low-interaction honeypots for the identified one or more representative applications;
   probing the one or more representative applications to retrieve a plurality of responses corresponding to a plurality of requests;
   generating one or more templates corresponding to one or more request-response pairs by parsing the plurality of responses and the plurality of requests;

responding, through the one or more low-interaction honeypots, to one or more new requests for accessing the plurality of resources using the generated one or more templates, wherein responding to the one or more new requests for accessing the plurality of resources using the one or more templates comprises analyzing the one or more templates to determine best templates to respond to the one or more new requests and generating the corresponding responses based on the determined best templates; and recording the one or more new requests and corresponding responses.

8. The computer implemented method of claim 7, wherein identifying the one or more representative applications comprises:
identifying the plurality of resources in the network;
determining one or more applications corresponding to the plurality of resources; and
identifying the one or more representative application from the one or more applications for the plurality of resources that share same characteristics.

9. The computer implemented method of claim 7, wherein the best templates to respond to the one or more new requests are determined based on ranks associated with the one or more templates.

10. The computer implemented method of claim 7, wherein parsing the plurality of responses and the plurality of requests comprises:
identifying static and non-static resources in the plurality of resources by determining differences in the plurality of responses for identical requests; and
generating the one or more templates based on the identified static and non-static resources.

11. The computer implemented method of claim 7, wherein parsing the plurality of responses and the plurality of requests comprises applying diffing to generate the one or more templates.

12. The computer implemented method of claim 7, wherein automatically generating the one or more low-interaction honeypots further comprises deploying a honeypot factory instance to operate the generated one or more low-interaction honeypots in the network.

13. A computing system to automatically generate low-interaction honeypots, comprising:
at least one processor; and
one or more memory devices communicative with the at least one processor, wherein the one or more memory devices store instructions to:
identify one or more representative applications associated with a plurality of resources in a network;
automatically generate one or more low-interaction honeypots for the identified one or more representative applications;
probe the one or more representative applications to retrieve a plurality of responses corresponding to a plurality of requests;
generate one or more templates corresponding to one or more request-response pairs by parsing the plurality of responses and the plurality of requests;
respond, through the one or more low-interaction honeypots, to one or more new requests for accessing the plurality of resources using the generated one or more templates,
wherein responding to the one or more new requests for accessing the plurality of resources using the one or more templates comprises analyzing the one or more templates to determine best templates to respond to the one or more new requests and generating the corresponding responses based on the determined best templates; and
record the one or more new requests and corresponding responses.

14. The computing system of claim 13, wherein identifying the one or more representative applications comprises:
identify the plurality of resources in the network;
determine one or more applications corresponding to the plurality of resources; and
identify the one or more representative application from the one or more applications for the plurality of resources that share same characteristics.

15. The computing system of claim 13, wherein parsing the plurality of responses and the plurality of requests comprises:
identify static and non-static resources in the plurality of resources by determining differences in the plurality of responses for identical requests; and
generate the one or more templates based on the identified static and non-static resources.

16. The computing system of claim 13, wherein parsing the plurality of responses and the plurality of requests comprises applying diffing to generate the one or more templates.

17. The computing system of claim 13, wherein automatically generating the one or more low-interaction honeypots further comprises deploying a honeypot factory instance to operate the generated one or more low-interaction honeypots in the network.

* * * * *